(12) United States Patent
Shivamoggi et al.

(10) Patent No.: US 11,770,387 B1
(45) Date of Patent: Sep. 26, 2023

(54) GRAPH-BASED DETECTION OF LATERAL MOVEMENT IN COMPUTER NETWORKS

(71) Applicant: Rapid7, Inc., Boston, MA (US)

(72) Inventors: Vasudha Shivamoggi, Cambridge, MA (US); Roy Donald Hodgman, Cambridge, MA (US); Katherine Wilbur, Brookline, MA (US)

(73) Assignee: Rapid7, Inc., Boston, MA (US)

( * ) Notice: Subject to any disclaimer, the term of this patent is extended or adjusted under 35 U.S.C. 154(b) by 246 days.

(21) Appl. No.: 16/931,923

(22) Filed: Jul. 17, 2020

(51) Int. Cl.
*H04L 9/40* (2022.01)
*G06F 21/55* (2013.01)

(52) U.S. Cl.
CPC ......... *H04L 63/1416* (2013.01); *G06F 21/552* (2013.01); *H04L 63/1425* (2013.01); *H04L 63/1441* (2013.01)

(58) Field of Classification Search
CPC ............... H04L 63/1416; G06F 21/552; H04L 63/1425; H04L 63/1441
USPC ...................................................... 726/23
See application file for complete search history.

(56) References Cited

U.S. PATENT DOCUMENTS

| | | | |
|---|---|---|---|
| 7,624,448 B2* | 11/2009 | Coffman et al. ... | H04L 63/1416 726/22 |
| 8,150,783 B2 | 4/2012 | Gonsalves et al. | |
| 8,191,149 B2 | 5/2012 | Yun et al. | |
| 9,141,790 B2* | 9/2015 | Roundy et al. ...... | G06F 21/577 |
| 9,202,052 B1* | 12/2015 | Fang et al. ........... | G06F 21/552 |
| 9,591,006 B2* | 3/2017 | Siva Kumar et al. .. | H04L 63/10 |
| 10,476,898 B2* | 11/2019 | Muddu et al. ....... | G06F 16/285 |
| 2006/0070128 A1 | 3/2006 | Heimerdinger et al. | |
| 2006/0288415 A1 | 12/2006 | Wong | |
| 2009/0099988 A1 | 4/2009 | Stokes et al. | |
| 2010/0192226 A1* | 7/2010 | Noel et al. ............. | H04L 41/12 726/25 |
| 2011/0167493 A1 | 7/2011 | Song et al. | |
| 2012/0180126 A1 | 7/2012 | Liu et al. | |
| 2012/0227108 A1 | 9/2012 | Noel et al. | |
| 2016/0219066 A1* | 7/2016 | Vasseur et al. .... | H04L 63/1458 |
| 2016/0253232 A1* | 9/2016 | Puri et al. .......... | H04L 63/1425 714/37 |
| 2016/0269424 A1 | 9/2016 | Chandola et al. | |
| 2016/0330226 A1* | 11/2016 | Chen et al. ............ | H04L 63/14 |
| 2018/0316704 A1* | 11/2018 | Durairaj et al. ..... | G06F 21/316 |
| 2018/0367548 A1* | 12/2018 | Stokes, III et al. | H04L 63/1416 |
| 2020/0137104 A1* | 4/2020 | Hassanzadeh et al. ..................... H04L 63/1433 | |
| 2020/0177617 A1* | 6/2020 | Hadar et al. ......... | G06F 21/577 |
| 2020/0177618 A1* | 6/2020 | Hassanzadeh et al. | G06F 21/552 |
| 2021/0218770 A1* | 7/2021 | Ben-Yosef et al. .. | G06F 21/554 |

\* cited by examiner

*Primary Examiner* — Badri Narayanan Champakesan
(74) *Attorney, Agent, or Firm* — Ashwin Anand; Lei Sun

(57) ABSTRACT

Systems and methods are disclosed to implement a cyberattack detection system that monitors a computer network for lateral movement. In embodiments, the system uses network data from a computer network to build a baseline of connection behaviors for the network. Connection graphs are generated from new network data that indicate groups of nodes that made connections with one another during a last time interval. The graphs are analyzed for connection behavior anomalies and ranked to determine a subset of graphs with suspected lateral movement. Graphs with suspected lateral movement may be further analyzed to determine a set of possible attack paths in the lateral movements. The suspected attack paths are reported to network administrators via a notification interface. Advantageously, the disclosed system is able to detect potential lateral movements in localized portions of a network by monitoring for connection behavior anomalies in network data gathered from the network.

20 Claims, 11 Drawing Sheets

| network data 122 | | | | | | | | |
|---|---|---|---|---|---|---|---|---|
| | | | | | scanner node? 342 | whitelisted connection? 344 | first time using protocol? 346 | first time connecting to destination? 348 |
| network node 332 | destination node 334 | connection protocol 336 | connection made? 338 | connection time 339 | | | | |
| Node 1 | Node 2 | SSH | | 10:00 am | | | | |
| | Node 4 | RDP | | 10:30 am | | Yes | | |
| Node 2 | Node 4 | RDP | | 3:00 am | | | Yes | Yes |
| | Node 5 | WinRM | | 3:00 am | Yes | | | Yes |
| | Node 6 | RDP | | 3:00 pm | | Yes | | |
| Node 3 | Node 7 | SMB | No | | | | | |

FIG. 3

Configure Lateral Movement Detection 750

General Settings: 760

☒ Periodically report suspected lateral movement, once every __7__ days

☒ Automatically update network behavior baseline    [Configure Auto Update Rules]

☒ Detect lateral movement on communication protocol(s): __SSH, RDP, WinRM__    [Set IP / CIDR address list]

☒ Exclude nodes from detection process

☒ Exclude and report suspected scanner nodes with __6__ or more outgoing connections

Connection Graph Evaluation Settings: 770

Report highest ranking __5__ graphs

[Configure Graph Ranking Metric]

Connection Path Evaluation Settings: 780

Attack paths must be of length __3__ or more

Successive connections in paths must be within __24__ hour(s)

Report highest ranking __2__ path(s) per graph

[Configure Path Ranking Metric]

GRAPH-BASED DETECTION OF LATERAL MOVEMENT IN COMPUTER NETWORKS

BACKGROUND

Lateral movement is a stage of cyberattacks where an attacker progressively moves through an organization's network to search for high-value targets. If a network owner can detect an attacker's lateral movement in the network as it is happening, the attack can be stopped before valuable data is exfiltrated or critical resources are compromised. However, lateral movement is notoriously hard to detect. Conventional methods for detecting lateral movement attacks involves monitoring endpoint metadata such as endpoint authentication logs. However, endpoint metadata can be burdensome to collect, as it typically requires specialized data collection agents to be deployed on the network nodes. Moreover, collected data about a network can be noisy, as it captures large amounts of legitimate activities in the network. Thus, attack monitoring systems typically rely on some degree of human analysis to verify detected attack signals. Such human analysis can be extremely labor-intensive, time-consuming, and error-prone for large networks. Accordingly, there is general need in the field for improved methods of detecting lateral movements in computer networks that reduces the use of endpoint metadata and limits the amount of human effort needed to review detected attack signals.

SUMMARY OF EMBODIMENTS

The systems and methods described herein may be employed in various combinations and embodiments to implement a cyberattack detection system that monitors a computer network for lateral movement. In some embodiments, the system collects network data from a computer network, which indicates connections among nodes in the network. The system uses the network data to build a baseline of connection behaviors for the network. The system periodically generates connection graphs from the network data that indicate groups of nodes that made connections with one another during a time interval. The graphs are analyzed for anomalies and ranked based on a likelihood that suspected lateral movement has occurred in the graphs. In some embodiments, the highest-ranking graphs are analyzed further to determine a set of possible attack paths of the lateral movements, which are reported to network administrators via a notification interface. Advantageously, the disclosed system is able to detect and report potential lateral movements in portions of a network by monitoring for connection behavior anomalies in network data gathered from the network.

BRIEF DESCRIPTION OF THE DRAWINGS

FIG. 3 illustrates example network data that is used by a cyberattack detection system to detect suspected lateral movements in a computer network, according to some embodiments.

FIG. 7B illustrates an example configuration interface of the cyberattack detection system that allows users to configure operational aspects of the system, according to some embodiments.

Figure 1:
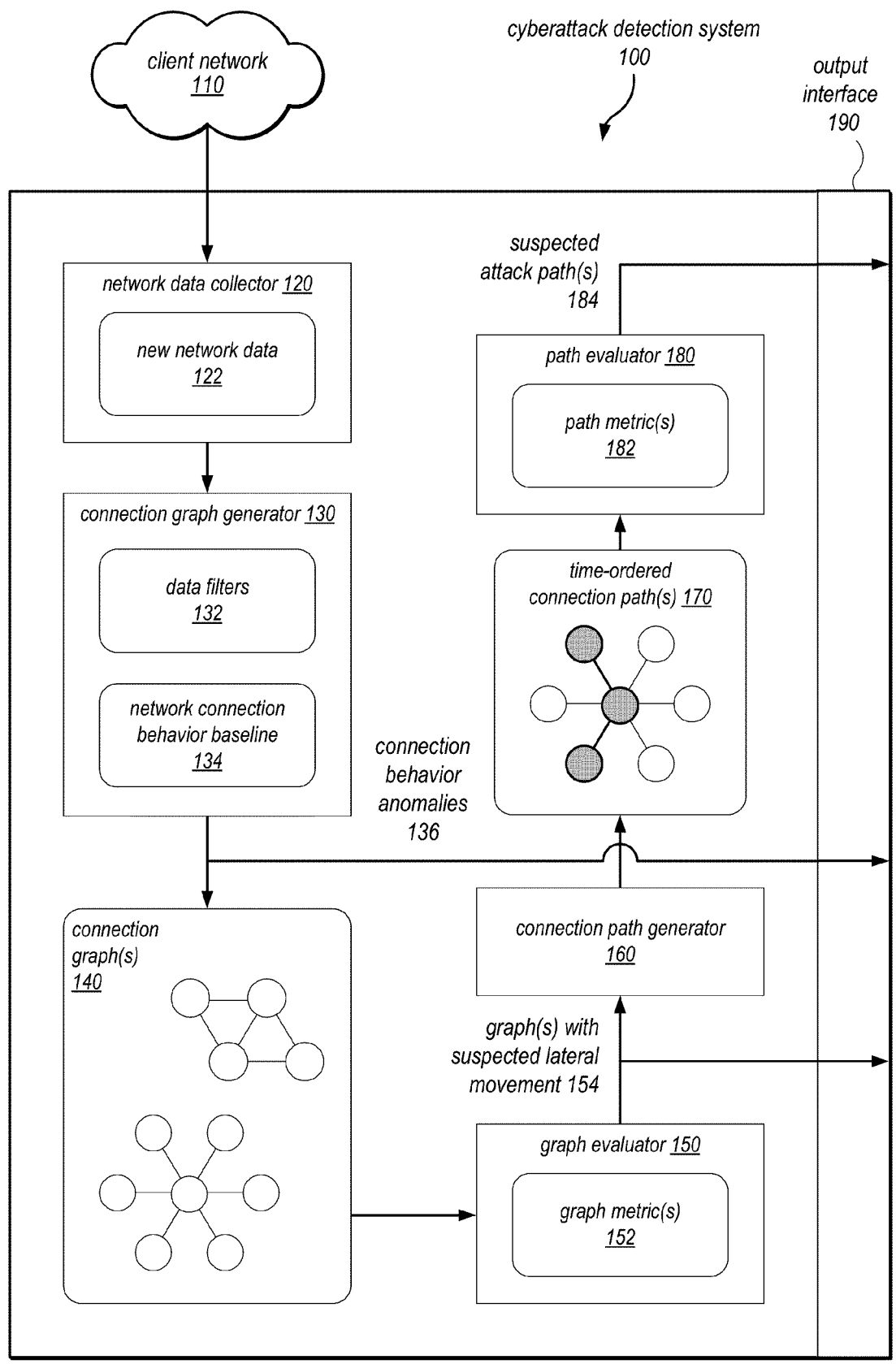
FIG. 1 is a block diagram illustrating an example cyberattack detection system that uses connection graphs to detect suspected lateral movements in a computer network, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Lateral movement is a stage of cyberattack where an attacker progressively moves through an organization's network to search for high-value targets. If a cyberattack detection system can detect an attacker's lateral movement in time, measures can be taken to stop the attack before valuable data is exfiltrated or critical resources are compromised. However, lateral movement is notoriously hard to detect. Conventional methods for detecting lateral movement attacks typically involves monitoring endpoint metadata such as endpoint authentication logs. However, endpoint metadata is difficult to collect for some networks, as it typically requires specialized data collection agents to be deployed on the network nodes. The agents' activities can use up precious memory and storage capacity of the nodes, and interfere with nodes' normal operations. Moreover, collected data about a network tends be extremely noisy, as it captures mostly legitimate activities in the network. Some networks may exhibit legitimate lateral movement activities by actual users that do not look very different from lateral movement activities by attackers. Accordingly, many attack monitoring systems rely on some degree of human analysis to verify detected attack signals. Such human analysis can be labor-intensive, time-consuming, and error-prone for large networks.

Accordingly, to address these and other problems in the state of the art, embodiments of a cyberattack detection system are disclosed herein. In some embodiments, the cyberattack detection system monitors a computer network by periodically collecting network data from the computer network. The network data may be connected by a networking device in the computer network, which does not interfere with the operations of the network nodes themselves. In some embodiments, the network data may include metadata about internal connections that were made among nodes of the network during a time interval. For example, the network data may indicate, for individual nodes in the network, which other nodes a node connected to, what connection protocols were used, when connections were made, how much data was transmitted over the connections, etc.

In some embodiments, the system may use the collected network data to build a history or baseline of the normal connection behavior pattern of the network. The baseline may be compared to later network data to identify anomalies in the network's behavior. Examples of anomalous behaviors may include a node using a communication protocol for a first time during a time interval, a node connecting to new destination node during the time interval, or a node qualitatively changing its remote access behavior during the time interval, among other types of events. Detected anomalies are used to enrich subsequent analysis steps in the lateral movement detection process. By focusing on uncharacteristic changes in the network behavior at individual time intervals, the system is able to filter out much of the routine noise in the network data, and surface to users only a small set of anomalous events that are more salient indicators of an attack.

In some embodiments, detected anomalies in the network data may be immediately reported to the network administrator, who will review the anomalies and possibly take mitigation actions on the anomalies. In some cases, reported anomalies may be whitelisted by the network administrator after being reviewed. The whitelisted anomalous behaviors are then added to the baseline as part of the accepted normal behavior of the network. In this manner, the baseline can be expanded over time to provide a more effective filter for anomaly detection in future time intervals.

In some embodiments, the system will use newly collected network data to generate a set of connection graphs for each time interval. Each connection graph will indicate subset of nodes in the network that made connections to one another during the time interval. Each edge in the graph will indicate a set of connections between two nodes during the time interval and metadata about the set of connections. In some embodiments, the graphs may be limited to a set of communication protocols of interest. The communication protocol of a connection may be determined during data collection based on the destination port number used by the connection or a superficial examination of the traffic transmitted over the connection.

In some embodiments, the system will filter the network data to remove certain types of undesired data from the graph generation process. For example, the system may remove nodes that are known or detected network scanners, which are configured to programmatically attempt connections with many nodes in the network for different purposes such as routine monitoring. The inclusion of these scanner nodes in the graph generation process will cause many otherwise unrelated nodes in the network to be grouped into a single graph, which misrepresents the actual connection behavior of the network.

In some embodiments, the connection graphs are scored using a graph metric that indicates how unusual the connection behavior of each graph looks in terms of indicators of lateral movement. In some embodiments, the graph metric may be computed based on properties of the graph such as the graph's order, size, diameter, and highest node degree. In some embodiments, the graph metric may also be based on other factors such as the number of distinct protocols indicated in the graph, the presence or number of new nodes in the graph (e.g. nodes using a communication protocol for a first time), or the presence or number of new edges in the graph (e.g. nodes connecting to a new destination node for a first time). The graphs may be ranked according to the graph metric, and the highest-ranking graphs are retained for further analysis. In some embodiments, the highest-ranking graphs are reported to the network administrators.

In some embodiments, connection graphs that have been identified for suspected lateral movements are further analyzed by the system to determine the suspected attack paths of the lateral movements. In a typical lateral movement, an attacker first connects to one node in the network, and uses that node to connect to another node in the network, and so on. Accordingly, a candidate attack path is a sequence of time-ordered connections that links a series of nodes in the connection graph. In some embodiments, all time-ordered paths identified in a connection graph are ranked according to a path metric, and the highest-ranking paths are reported to network administrators for manual review. Depending on the embodiment, the path metric may be computed based on factors such as number of path links, number of new nodes in the path, number of new edges in the path, and number of distinct communication protocols used in the path, etc.

In some embodiments, the system may compute a network behavior tracking metric for the entire network at each time interval based on all path metrics computed for the time interval. The network behavior tracking metric is monitored over successive time intervals, and a large change in the metric in one interval will trigger an alert to the network administrator. For example, in some embodiments, the system may monitor for spikes in the network behavior tracking metric based on a moving average over time. A sudden spike in the metric indicates an increase of the anomalous behavior in the network, and this condition will be be reported to the administrators for manual review.

As will be appreciated by those skilled in the art, the disclosed features of the cyberattack detection system provide numerous technical improvements to enhance the functioning of existing attack monitoring systems in the state of the art.

In one respect, embodiments of the disclosed system do not require the use of endpoint metadata such as endpoint authentication logs which can be difficult to collect. Rather, the disclosed system may be configured to collect network data transmitted among the nodes, and monitor such data for temporal changes in the network's behavior. This changed-based monitoring approach may be used to detect virtually any type of lateral movement in the network, without requiring endpoint metadata to be collected from the nodes.

Additionally, embodiments of the disclosed system limit the amount of data that is flagged for programmatic analysis or human review by flagging only small portions of the network (individual connection graphs or paths) and only a small number of the portions (only the highest-ranking graphs or paths). Accordingly, the system does not require significant amounts of computing resources to monitor even large networks, and will not overwhelm network administrators with large numbers of alerts. These and other features and benefits of the lateral movement detection system are described in further detail below, in connection with the figures.

FIG. 1 is a block diagram illustrating an example cyberattack detection system that uses connection graphs to detect suspected lateral movements in a computer network, according to some embodiments.

As shown, the figure depicts a cyberattack attack system 100 that is configured to monitor a client network 110 for signs of lateral movement. In some embodiments, the monitoring may be performed by collecting network data 122 from the client network 110 using a network data collector component 120. In some embodiments, the network data may be collected at network data collection points (e.g. networking switches or routers) in the client network, so that no specialized data collection agents are deployed on the network nodes themselves. In some embodiments, endpoint data collection agents may be used to collect endpoint metadata in addition to the network data, in order to augment the data used for lateral movement detection. In some embodiments, the collected network data 122 may be stored in a database and used for different types of security assessments of the client network, in addition to detection of lateral movements. In some embodiments, the lateral movement detection process implemented by the detection system 100 may be an ongoing process that continuously monitors the client network for possible signs of lateral movement based on new collections of network data. When a lateral movement is detected, the system 100 will generate an alert via an output interface 190.

In some embodiments, the output interface 190 may be a user interface that is configured to report various findings of the detection system 100 to network administrators. For example, the system 100 may report its findings at different stages of the detection process to indicate things such as connection behavior anomalies 136, connection graphs indicating suspected lateral movement attacks 154, and/or suspected attack paths 184. In some embodiments, the output interface 190 may be a graphical user interface (GUI), such as a web-based interface that can be displayed using a web browser. In some embodiments, the output interface 190 may be an alert or notification interface that pushes alerts or notifications to registered user accounts. For example, registered users of the system may be able to receive alerts or notifications from the system via email, text, or some other data push mechanism. In some embodiments, the output interface 190 may log the system's output to a log file or some other type of data repository.

In some embodiments, the collected network data 122 may include information about network connections that were established among nodes of the client network. In some embodiments, the connection data may also include information about attempted connections (or connection requests) that did not result in an established connection. The network data 122 may include metadata about each captured connection, such as the source and destination nodes of the connection, the communication protocol of the connection, the connection time and/or time length of the connection, the user that initiated the connection, the amount of data that was uploaded or downloaded over the connection, among other information.

In some embodiments, the collected network data collected in past time periods or intervals may be aggregated to build a history or baseline 134 of the connection behavior of the client network 110. The baseline 134 may be persisted in a database. The baseline 134 of the client network will indicate a set of connection behaviors of the client network that is assumed or known to be legitimate (e.g. not associated with a cyberattack). For example, if two nodes in the network routinely connects to each other in a regular manner, these connections may be included in the baseline. In some embodiments, particular connection behaviors in the client network will be deemed to be legitimate behavior if they occur repeatedly (e.g. over some set number of observation periods), if they meet certain legitimacy criteria (e.g. if the connections were initiated by a trusted application), or if they were explicitly whitelisted by a human administrator. As more network data is received and verified over time, the baseline will be expanded to incorporate more of the known legitimate connection behaviors of the client network 110.

In some embodiments, the network data 122 collected at each new time interval will be processed by a connection graph generator component 130 to generate a set of connection graphs 140. The graph generator may compare the new network data 122 against the connection behavior baseline 134 of the network to determine any connection behavior anomalies 136 during the new time interval, which will be incorporated into the connection graphs 140 and/or reported to network administrators via the output interface 190. Examples of connection behavior anomalies 136 may include conditions such as a node using a new communication protocol for the first time during a time interval, a node connecting to a new destination node for the first time during a time interval, or some other type of qualitative change in a node's connection behavior during the time interval (e.g. the node connecting to a large number of other nodes, the node connecting at an abnormal time or for an abnormally long length of time, etc.).

In some embodiments, the connection graph generator 130 may use data filters 132 to filter the newly collected network data 122, so that certain nodes or connections in the network data will be excluded from the rest of the detection process. For example, nodes that are known network scanners (e.g. nodes that are configured to attempt connections to a large number of other nodes in the network) may be excluded. Known scanner nodes generally add noise to the network data, and they cause the connection graphs 140 to appear more heavily connected than they actually are. In some embodiments, nodes that are not known scanner nodes but exhibiting scanner-like behavior will also be excluded from the graphs 140. Although such nodes may be engaging in a malicious reconnaissance of the network, they may still be removed to keep the generated graphs 140 from being coalesced together. However, a suspected malicious scanner node will be reported as one type of behavior anomaly 136 by the graph generator. In some embodiments, certain node-to-node connections may also be filtered out for a variety of reasons. For example, a connection that was whitelisted as a legitimate connection will be excluded from the connection graphs 140. In some embodiments, the data filters 132 may be specified as filtering rules through a configuration interface of the system 100.

As shown, the connection graph generator 130 will generate a set of connections graphs 140 of the network. In some embodiments, the graphs 140 may be generated periodically according to a set schedule (e.g. once a week). In some embodiments, the graph generation may be triggered based on the occurrence of one or more triggering conditions. Examples of triggering conditions may include detection of a particular type of connection behavior anomaly 136 (e.g. the presence of a malicious scanner), an excessive number of detected anomalies, a spike in the activity level of the network (or a particular node), etc. In some embodiments, the triggering conditions may be defined via the configuration interface of the system 100.

The connection graphs 140 will indicate distinct subsets of nodes in the network that made or attempted to make connections to each other during the time interval. For example, a particular connection graph may include a group of developer laptops that all connected to a code repository server during the past week. In some embodiments, each edge in a graph will indicate a set of one or more connections made between the two nodes connected by that edge. The edges and nodes in the graph may be associated with various attributes obtained or inferred from the network data, including various indicators of detected behavior anomalies 136. For example, a node attribute may indicate that the node is a new node that is using a communication protocol for the first time. An edge attribute may indicate that a particular connection is a first-time connection between a source node to a new destination node. In some embodiments, a graph node or edge may include an attribute that represents a negative indicator for lateral movement. For example, in some embodiments, a graph edge may be tagged with an attribute indicating that is consistent with the network's baseline behavior and not likely part of a cyberattack. These graph indicators will be taken into account when the graph is evaluated for signs of lateral movement.

As shown, once the connection graphs 140 are generated, they are evaluated by a graph evaluator 150. The graph evaluator 140 is configured to compute graph metrics 152 for each of the graphs 140, and use the graph metrics 152 to determine which graphs 154 indicate signs of suspected lateral movement. The graph metric 152 may be computed based on a variety of factors. In some embodiments, the graph metric may take into account various properties of the graph, such as its order (number of nodes), its size (number of edges), its diameter (the longest shortest path connecting any two nodes), and/or the highest node degree (the largest edge count among all node), among other properties. In some embodiments, the graph metric may take into account the number of distinct communication protocols that are indicated by the graph. Accordingly, in some embodiments, larger graphs that include more nodes, edges, and/or communication protocols will represent more likely candidates for lateral movement. As discussed, in some embodiments, the graph metric 152 will also be impacted by various indicators of anomalous behavior 136 indicated in the graph. For example, the presence or count of new nodes or new edges in a graph may increase the value of the graph metric, making the graph a more likely candidate for a suspected lateral movement.

Depending on the embodiment, the graph metric 152 may be computed in a variety of different ways. In some embodiments, each component of the graph metric may be normalized and then combined based on a formula to generate a numerical score. For example, the size of a graph may be normalized by mapping the value of the property to a bounded range (e.g. 1 to 100) using a normalization function. The normalized values of each property may then be added together to produce the final value for the graph metric. In some embodiments, certain components of the graph metric may be weighed more than other components. In some embodiments, various parameters controlling the computation of the graph metric 152 may be configurable by the network administrator via the configuration interface of the system.

In some embodiments, the set of candidates 154 for suspected lateral movement is determined by ranking the graph metrics 152 of all connection graphs 140 generated for a particular time interval. In some embodiments, the metrics of all graphs are ranked, and a specified number of highest-ranking graphs will be the candidates 154. In some embodiments, the candidate graphs 154 may be selected based on other or additional criteria, such as a minimum threshold value of the graph metric. In some embodiments, the selection criteria for candidate graphs 154 may be configurable via the configuration interface of the system 100. As shown in this example, the candidate graphs 154 with suspected lateral movement are reported to the network administrator via the output interface 190.

In some embodiments, the candidate graphs 154 are further analyzed to determine suspected attack paths 184 in the graphs. As shown, a connection path generator component 160 is used to generate a set of timed-ordered connection paths 170 for each candidate graph 154. In some embodiments, the path generator 160 will generate all possible time-ordered connection paths for each candidate graph 154. A time-ordered connection path 170 will indicate a sequence of connections that were made in time order by a series of nodes in the candidate graph. In some embodiments, each link in a connection path can represent multiple connections between the two nodes, and indicate the count of connections in the link as a link attribute. In some embodiments, other types of path attributes may be indicated by the time-ordered connection paths, such as the frequency of connections in a link, the number of bytes transferred using the connections in the link, the average connection time associated with the connections in the link, etc. In some embodiments, these connection path attributes may be used as weights or factors when the connection path is evaluated as a potential attack path.

In some embodiments, once the time-ordered connection paths 170 are generated for a particular connection graph 154, they are evaluated by a path evaluator component 180. Similar to the graph evaluator 150, the path evaluator 180 may generate respective path metrics 182 for each connection path 170 found in the graph. In some embodiments, the path metric 182 may depend on path properties such as the length of the path, the number of connections in the path, the amount of data transmitted over all connections in the path, the number of distinct protocols indicated in the path, etc. In some embodiments, the path metric may also take into account indicators of anomaly 136 included in the path, such as the presence or count of new nodes that used a communication protocol for a first time, or the presence or count of connections that represent a first-time connection between a source node and a destination node. In some embodiments, the path evaluator may compute a link metric for each link in the path, and combine the link metrics of all links to determine the path metric of the entire path. During such a calculation, certain link attributes such as connection count, connection frequency, connection time length, or amount of data transferred may be used as weights for the individual links.

Similar to the graph evaluator 150, in some embodiments, the path evaluator 180 will rank the path metrics 182 of all time-ordered connections in a graph, and determine a specified number of highest-ranking paths as the suspected attack paths 184. In some embodiments, the candidate paths 184 may be selected based on other or additional criteria, such as a minimum threshold value for the path metric. In some embodiments, the selection criteria for candidate paths 184 may be configurable via the configuration interface of the system 100. As shown, the determined attack paths 184 are reported to the network administrator via the output interface 190. In some embodiments, the suspected attack paths 184 may be reported together with their associated connection graphs 154.

Figure 2:
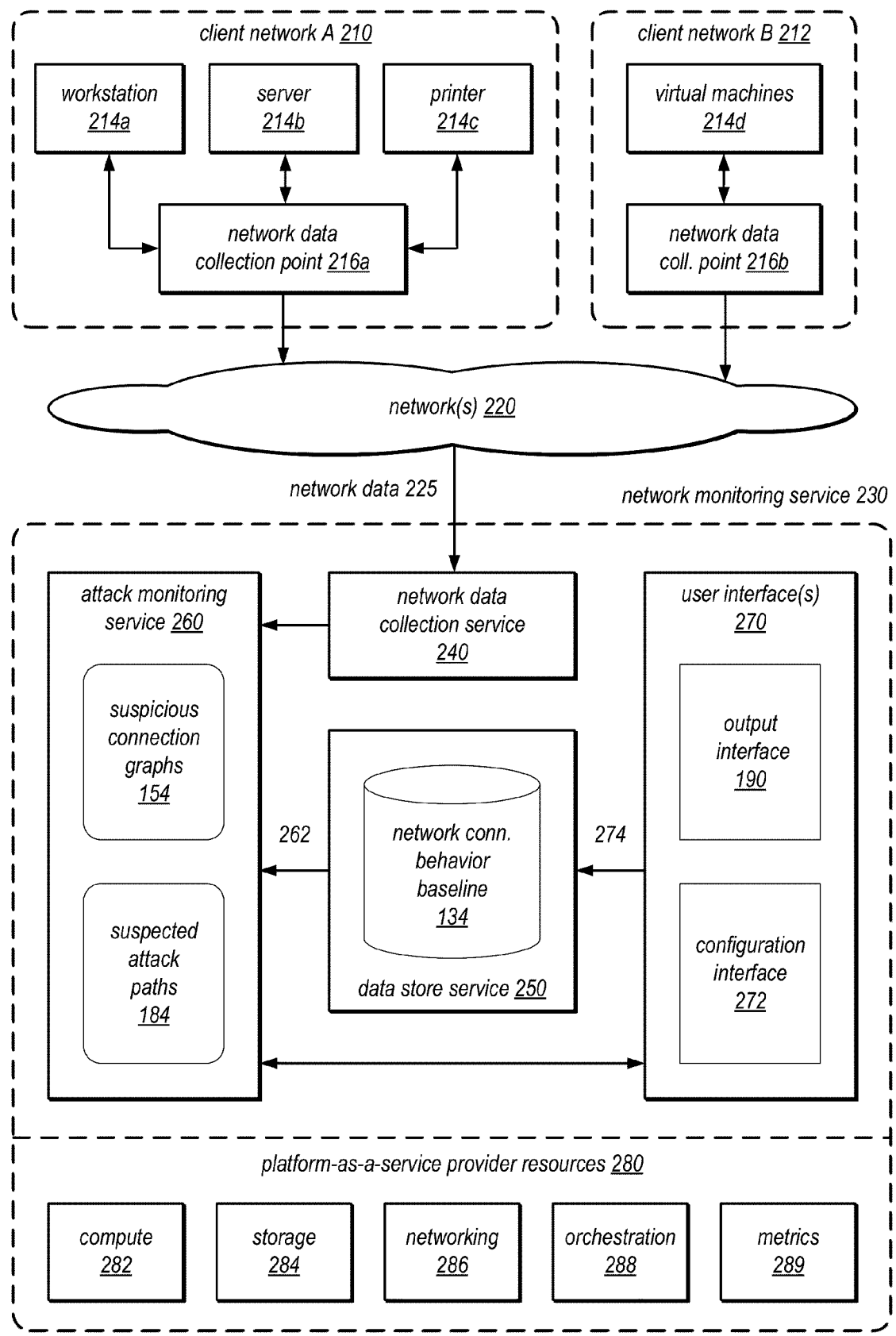
FIG. 2 is a block diagram illustrating a graph-based attack monitoring service that is implemented on a platform-as-a-service provider network, according to some embodiments.

FIG. 2 is a block diagram illustrating a graph-based attack monitoring service that is implemented on a platform-as-a-service provider network, according to some embodiments.

As shown in the figure, a network data collection service 240 and an attack monitoring service 260 are implemented as part a network monitoring service 230. In some embodiments, the network data collection service 240 may be configured to implement the network data collector 120 of FIG. 1, and the attack monitoring service 260 may be configured to implement the connection graph generator 130, connection graph evaluator 150, connection path generator 160, and connection path evaluator 180 of FIG. 1. The network monitoring service 230 is configured to monitor the remote client networks 210 and 220, which may be embodiments of the client network 110 of FIG. 1. The client networks may be operated by different companies, organizations, groups, or other types of entities that are customers of the network monitoring service 230. The network monitoring service may monitor the client networks for various types of conditions, including conditions regarding network configuration, security compliance, operational state and performance, and potential cyberattacks.

In various embodiments, the network(s) 220 may encompass any suitable combination of networking hardware and protocols necessary to establish communications between the client networks 210 and 212 and the network monitoring service 230. In some embodiments, the machines 214a-c may execute in a private network of a company, behind a company firewall. The network 220 may be a public network such as the Internet, which lies outside the firewall. In some embodiments, the network 220 may also include private networks such as private local area networks (LANs), private wide area networks (WANs), or private wireless networks. The network 220 may be implemented using different hardware (e.g., modems, routers, switches, load balancers, proxy servers, etc.) and software (e.g., protocol stack software, routing software, firewall/security software, etc.) for establishing networking links between the client networks 210 and 220 and the network monitoring service 230.

As shown, the client networks 210 and 220 include different types of nodes, such as a workstation 214a, a server 214b, a printer 214c, and a virtual machine 214d. The virtual machine 130d may be an instance of an emulated computer that is hosted on a physical virtual machine host. The virtual machine host may implement virtualization hardware and/or software (e.g. hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. Another type of virtualized execution environment is the container, which provides a portable and isolated execution environment over a host operating system of a physical host. Example implementations of container technologies include DOCKER, GOOGLE KUBERNETES, AMAZON WEB SERVICES, and MICROSOFT AZURE. As may be appreciated, machines 214a-d may include a variety of other types of computing systems, including embedded systems, networking devices, storage devices, Internet-of-Things (IoT) devices, vehicles, and the like.

As shown, each client network may implement one or more network data collection points 216, which are configured to collect network data 225 from the client networks. In some embodiments, these network data collection points 216 are distinct from the nodes 214a-d themselves, and may be implemented as a separate network entity, device, or host in the client network. For example, in some embodiments, a network data collection point may be implemented on a networking device such as a switch or a router in the client network. In some embodiments, a networking device configured as a network data collection point may implement a mirror port that sends a copy of the network traffic passing through the networking device (and/or associated network metadata) to a remote listener such as the network data collection service 240. In some embodiments where the node is a virtual machine, the network data collection point may be implemented by the hypervisor running on the virtualization host. In some embodiments, a network data collection point may be implemented using a separate data collection host that is connected to the networking device(s) of the client network. In this manner, collection of the network data will not impact the nodes 214a-d of the client networks. In some embodiments, the network data 225 will not include various types of endpoint metadata that are collected by specialized collection agents on the nodes.

As shown in this example, the network data collection service 240 provides the collected network data 225 to the attack monitoring service 260. The attack monitoring service 260 may implement the functionality to generate the connection graphs 154 with suspected lateral movements and suspected attack paths 184, as discussed in connection with FIG. 1. As shown, the network monitoring service 230 may include a data store service 250 that maintains the network connection behavior baseline 134 of FIG. 1. In some embodiments, the data store service 250 may be implemented on top of storage resources 284 provided by the PaaS provider. For example, the PaaS provider may provide storage in the form of a database, a file system, or a volume hosted in the cloud. In some embodiments, the provided storage may not be guaranteed to be persistent, so that if the service is restarted, some of data may be lost. In some embodiments, the provide storage may be enhanced using a high-performance in-memory cache, which may be implemented on a managed cluster of compute nodes such as a REDIS cluster. As shown in this example, the attack monitoring service 260 will access the data store service 250 in order to generate the connection graphs and connection paths.

As shown, the machine assessment service 130 may also implement a user interface 270, which may be a web-based graphical user interface. In this example, the user interface 270 provides the output interface 190 of FIG. 1, as well as a configuration interface 272 for the network monitoring service 230. In some embodiments, the configuration interface 272 may allow network administrators to configure parameters that control the operations of the network monitoring service. For example, the configuration interface 272 may allow users to specify configurable parameters such as a list of desired communication protocols to include in the connection graphs, a threshold number of spoke connections for detecting when a node is performing reconnaissance scanning, a list of Internet Protocol (IP) or Classless Inter-Domain Routing (CIDR) address ranges to be excluded from graph or path generation, a maximum time lag between connections to use when generating connection paths, or a minimum path length for suspected attack paths, among other parameters. As shown, the configuration interface 272 may also allow users to update 274 the network connection behavior baseline 134, for example, to add certain whitelisted nodes or connections to the baseline.

As shown, the network monitoring service 230 in this example is implemented on a platform-as-a-service provider network. In some embodiments, the network monitoring service 230 may be configured as a number of web services that receives web services requests formatted as JSON documents. The network monitoring service 230 may support REST-style or document-based (e.g., SOAP-based) types of web services requests. In some embodiments, the network monitoring service 230 may implement service interfaces using other types of remote procedure calling protocols, such as GOOGLE PROTOCOL BUFFERS or PROTOBUF. The PaaS provider network may provide hardware and/or software to implement service endpoints, so that a request directed to that endpoint is properly received and processed.

As shown, the PaaS provider network may provide different types of computing resources 280, which can be leased by service customers to implement custom hosted services. As shown, the PaaS provider may provide resource services such as compute resource service 282, storage resource service 284, networking resources service 286, orchestration service 288, and resource metrics service 289. The services of the network monitoring service 230 may be built using these underlying resource services provided by the PaaS provider. In some embodiments, the PaaS resources 280 may implement features such as load balancing of incoming service requests and/or dynamic management and scaling of service node pools. In some embodiments, each of the services 240, 250, 260, and 270 may be implemented using a pool of service nodes provided by the PaaS provider, which may be individual instances of virtual machines. In some embodiments, the PaaS provider may be a provider such as AMAZON WEB SERVICES or MICROSOFT AZURE.

FIG. 3 illustrates example network data that is used by a cyberattack detection system to detect suspected lateral movements in a computer network, according to some embodiments.

As shown, the network data 122 in this example is collected from the network in time intervals. In this example, the historical network data 310 from previous time intervals is stored in the same form as new network data 320 collected for a new time interval. In some embodiments, the historical network data 310 and new network data 320 may be stored in the same data store or in the same database table. The historical network data 310 may be used as the baseline of network connection behavior 134 of FIG. 1.

As shown, the network data 320 indicates connections that were made among nodes of the network during the new time interval. The network data 320 indicates that three nodes (nodes 1, 2, and 3) attempted connections to other nodes during the time interval. Each connection or attempted connection is reflected as a record in the depicted table.

As shown, the table includes a number of connection attributes of individual connections. Some of the attributes may be raw data attributes 330 that were collected from the network (e.g. data collected by the network data collection point 216 of FIG. 2). Other attributes may be additional data attributes 340 that are computed from the raw attributes or configuration settings (e.g. additional data computed by the network data collection service 240 of FIG. 2).

In this example, the raw data attributes 330 include connection attributes 334, 336, 338, and 339. Attribute 334 indicates the destination node of the connection. Attribute 336 indicates the connection protocol of the connection.

As shown, the communication protocols used by the connections in this example include the Secure Shell (SSH) protocol, Windows Remote Management (WinRM) protocol, Remote Desktop Protocol (RDP), and Server Message Block (SMB) protocol. As may be appreciated by those skilled in the art, other types of communication or remote access protocols may also be included. The connection protocol may be determined based on the destination port number of the connection, or inferred based on contents of the traffic transmitted over the connection. Attribute 338 indicates whether a connection was established. In some cases (e.g. node 3 in this example), a node may simply ping a server node without waiting to actually establish connection. This type of behavior may indicate that the node is engaging in a scanning of the network. Attribute 339 indicates the time when each connection was made. Though not shown in the figure, a variety of other types of raw connection attributes may also be included in the network data 122, such as a user that initiated the connection, the time length of the connection, the amount of data uploaded or downloaded using the connection, etc.

In this example, the additional data attributes 340 includes connection attributes 342, 344, 346, and 348. Attribute 342 indicates whether the source node 322 of the connection is categorized as a scanner node during the time interval. A node may be labeled a scanner node if it was explicitly indicated to be a scanner node by the user or determined to be a scanner node based on its connection behavior. For example, a node that is making a large number of outgoing connections during the time interval may be determined to be a malicious scanner. As discussed, in some embodiments, identified scanner nodes may be excluded from the connection graph generation process. Attribute 344 indicates whether an individual connection is a whitelisted connection. In some embodiments, connections with certain characteristics may be whitelisted by the user via one or more filtering rules. If a connection falls under a filtering rule, it will be filtered out from the graph generation process. Attribute 346 indicates whether an individual connection is the first time a node is using a particular communication protocol. In some embodiments, this attribute may be determined based on the historical network data 310 (or the connection behavior baseline 134). Attribute 348 indicates whether a particular connection is the first time the source node 332 has connected to the destination node 334. Attributes 346 and 348 are two examples of the connection behavior anomalies 136 determined during the time interval, which may be used to enrich the connection graphs generated by the lateral movement detection process. In some embodiments, any change to the raw data attribute 330 of the connections may be used as an anomaly indicator. Additional examples of other anomaly indicators may include an abnormally large number of connections made by the node, a new user making a connection from the node, one or more abnormally long connections of the node, and an abnormally large amount of data uploaded or downloaded by the node.

Figure 4:
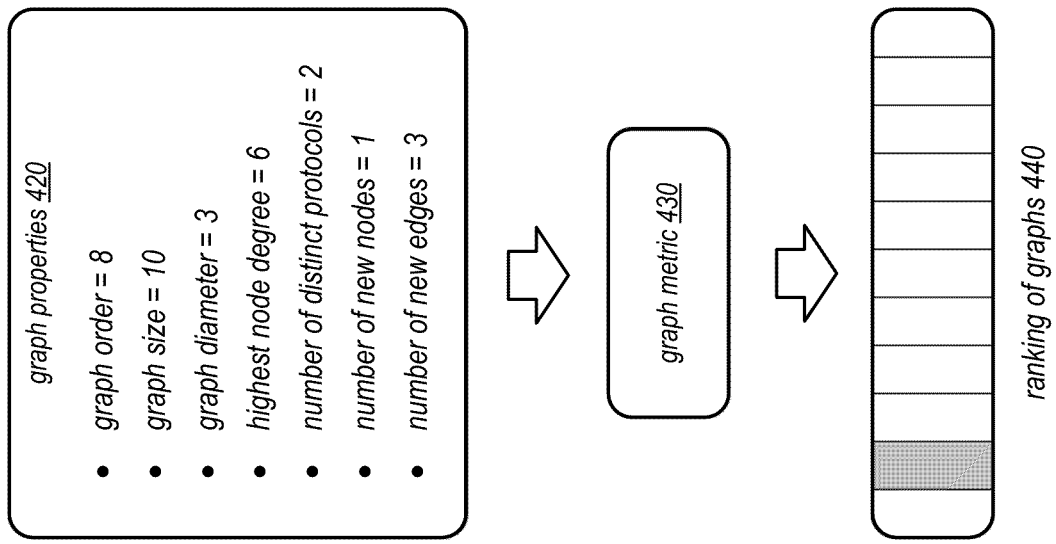
FIG. 4 illustrates an example connection graph generated by the cyberattack detection system, according to some embodiments.
Figure 4:
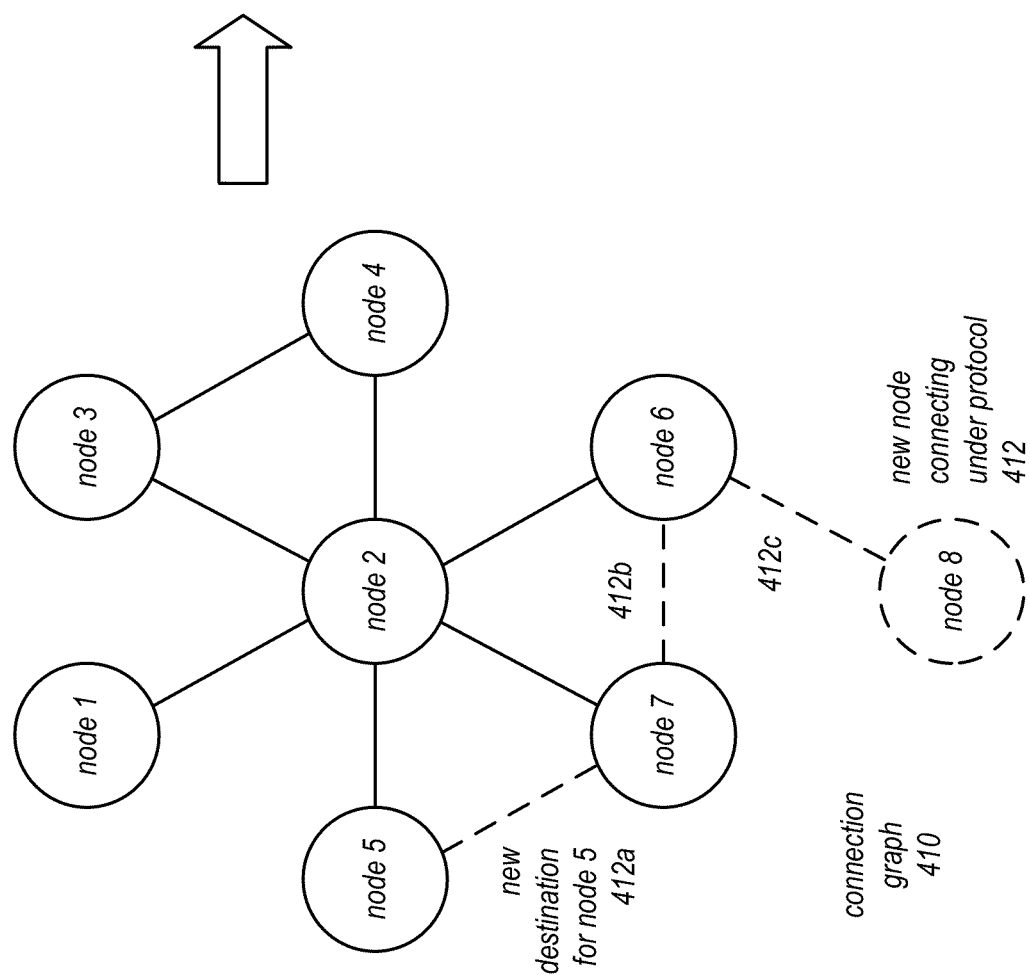

FIG. 4 illustrates an example connection graph generated by the cyberattack detection system, according to some embodiments. The connection graph 410 shown in the figure may be one of the connection graphs 140 of FIG. 1, and the graph metric 430 may be one of the graph metrics 152 of FIG. 1.

As shown, connection graph 410 indicates that eight nodes made or attempted connections to each other during a time interval. In this example, node 8 is a new node that is using a communication protocol for the first time. The dashed edges 412a-c indicate that connections where the source node is connecting to a new destination node for the first time. Both of these conditions may be considered connection behavior anomalies 136 in network, as discussed in connection with FIG. 1.

As shown, after the graph 410 is generated, it is analyzed to determine the graph metric 430, and the graph metric is used to rank 440 the graph 410 against other graphs generated from the network data during the same time interval. In some embodiments, this analysis may be performed by the graph evaluator 150 of FIG. 1. The graph evaluator may determine a specified number of highest-ranking graphs of the time interval to report as graphs with suspected lateral movement. By using this approach, the graph evaluator will only report a limited number of suspected graphs for any given time interval. In some embodiments, other criteria (such as a minimum value for the graph metric) may also be used to limit the graphs that are reported.

Depending on the embodiment, the graph metric 430 may be computed based on a variety of factors. As shown in this example, a set of graph properties 420 are used to compute the graph metric. Graph properties may include the graph's order (the number of nodes), the graph's size (the number of edges), the graph's diameter (the length of the longest shortest paths between any two nodes – here from node 5 to node 8), the graph's highest node degree (the most number of edges from any node – here node 2), and the number of distinct protocols indicated in the graph. Each edge in the graph may indicate a set of multiple connections between two nodes during the time interval, and also attributes about the multiple connections, such as the number of connections, the times of the connections, and the protocols used by the connections, etc. In some embodiments, the edges of the graph may be weighted based on one or more of their edge attributes during the graph metric calculation. Each node in the graph may indicate node attributes, such as various behavior anomaly indicators of the node. In this example, the number of new nodes in the graph and new edges in the graph are included in the graph properties 420 used to compute the graph metric 430. In some embodiments, the graph properties 420 used to compute the graph metric and the formula for computing the graph metric are configurable via the configuration interface of the system.

Figure 5:
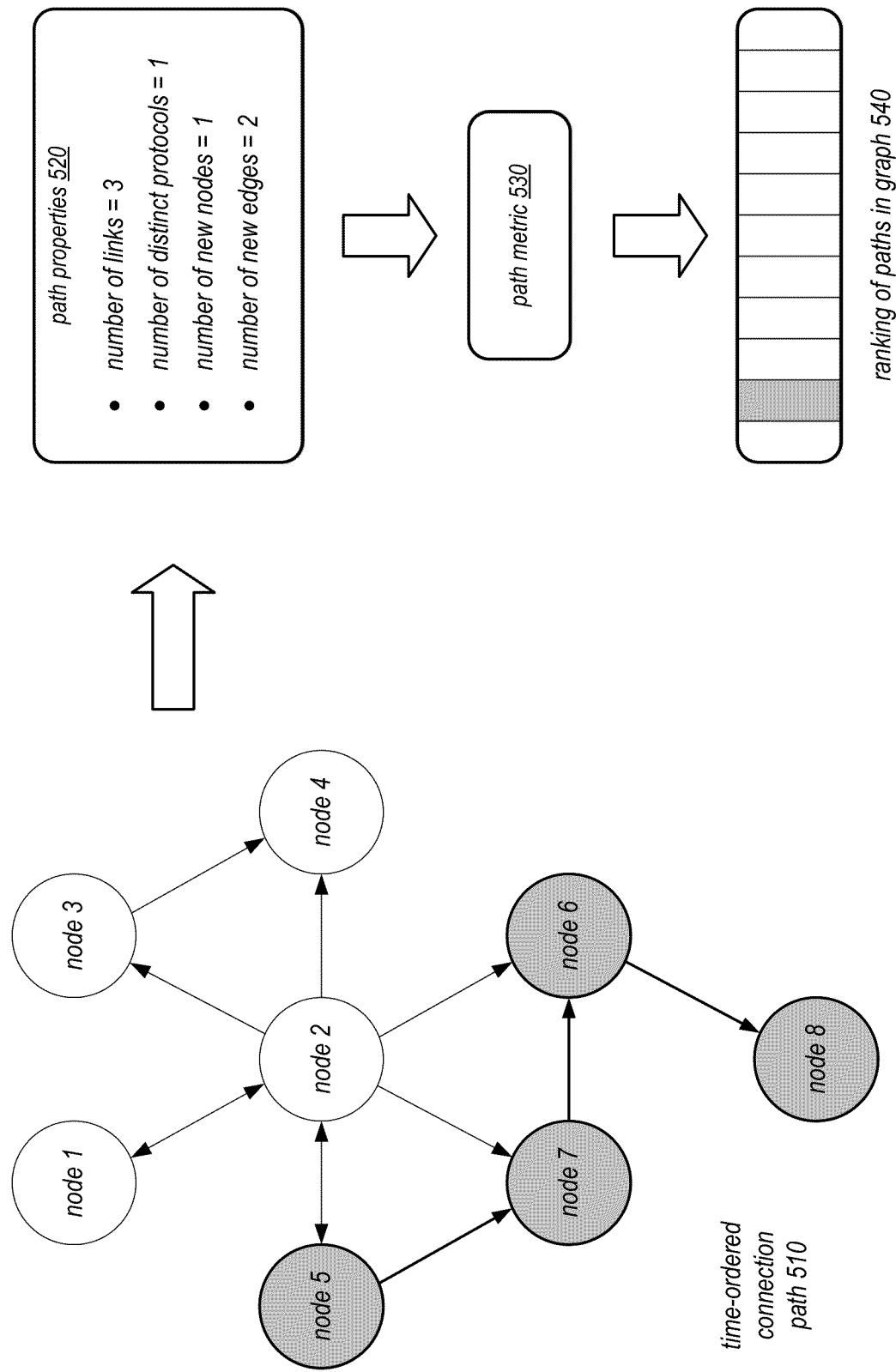
FIG. 5 illustrates an example connection path generated by the cyberattack detection system, according to some embodiments.

FIG. 5 illustrates an example connection path generated by the cyberattack detection system, according to some embodiments. The time-ordered connection path 510 shown in the figure may be one of the connection paths 170 of FIG. 1, and the path metric 530 may be one of the path metrics 182 of FIG. 1.

As shown, connection path 410 indicates a path of four nodes, from node 5 to node 8. The connection path links the nodes in the path via a sequence of time-ordered connections. Thus, the path 510 may represent a possible attack path taken during a lateral movement in the graph, where an attacker progressively moves from one node to the next in sequential fashion. In some embodiments, generated paths may be limited by configured filters, such as a maximum time lag between successive connections, a common user across the sequence of connections, etc.

As shown, after the path 510 is generated, it is analyzed to determine the path metric 430, which is used to rank 540 the path 510 against other time-ordered connection paths generated from the same connection graph. In some embodiments, this ranking may be performed by the path evaluator 180 of FIG. 1. The path evaluator may determine a specified number of highest-ranking paths as suspected attack paths of the lateral movement. By using this approach, the path evaluator will determine only a limited number of suspected paths for each graph. In some embodiments, other criteria (such as a minimum value for the path metric) may be used to further limit the paths that are reported as suspected attack paths.

Depending on the embodiment, the path metric 530 may be computed based on a variety of factors. As shown in this example, a set of path properties 520 are used to compute the path metric. Path properties may include the number of links in the path, the number of distinct protocols used in the path, and the number of new nodes or edges seen in the path, etc. In some embodiments, each link the path may indicate a set of multiple connections between the two connected nodes, and also attributes about the multiple connections such as the number of connections, the times of the connections, and the protocols used by the connections, etc. In some embodiments, the links of the path may be weighted based on one or more of their link attributes during the path metric calculation. Each node in the graph may also indicate node attributes, such as the degree of the node, and any behavior anomaly indicators of the node. In some embodiments, the path properties 520 used to compute the path metric and the formula for computing the path metric are configurable via the configuration interface of the system.

Figure 6A:
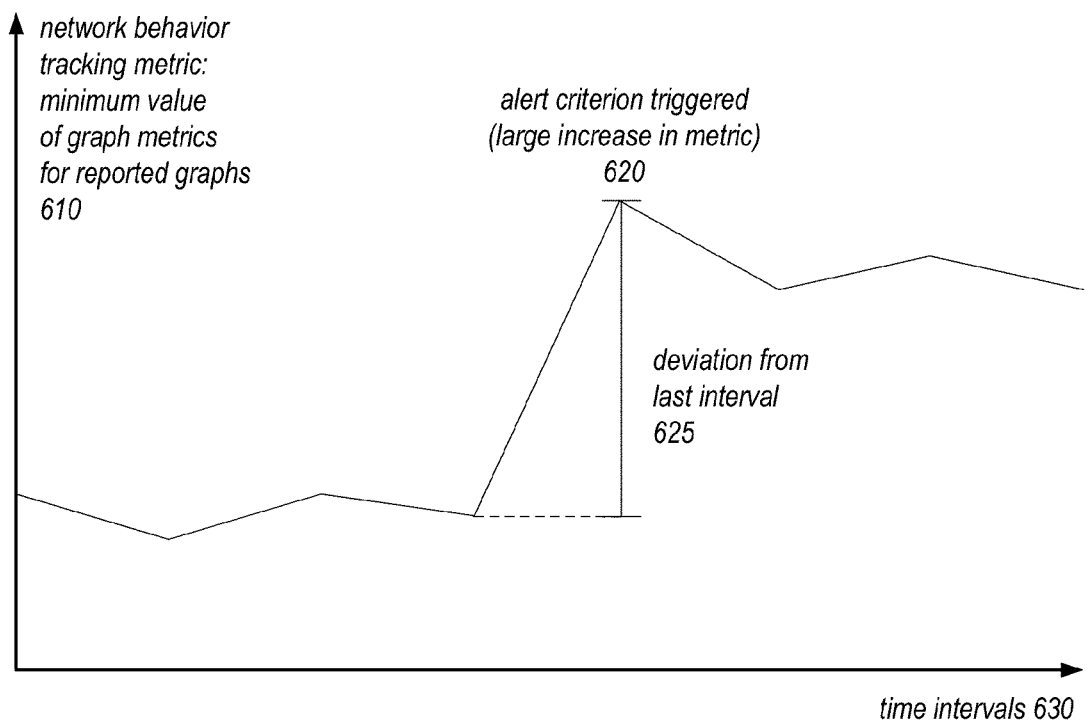
FIGS. 6A and 6B illustrate example network behavior tracking metrics that are used by the cyberattack detection system to generate alerts about a computer network.
Figure 6B:
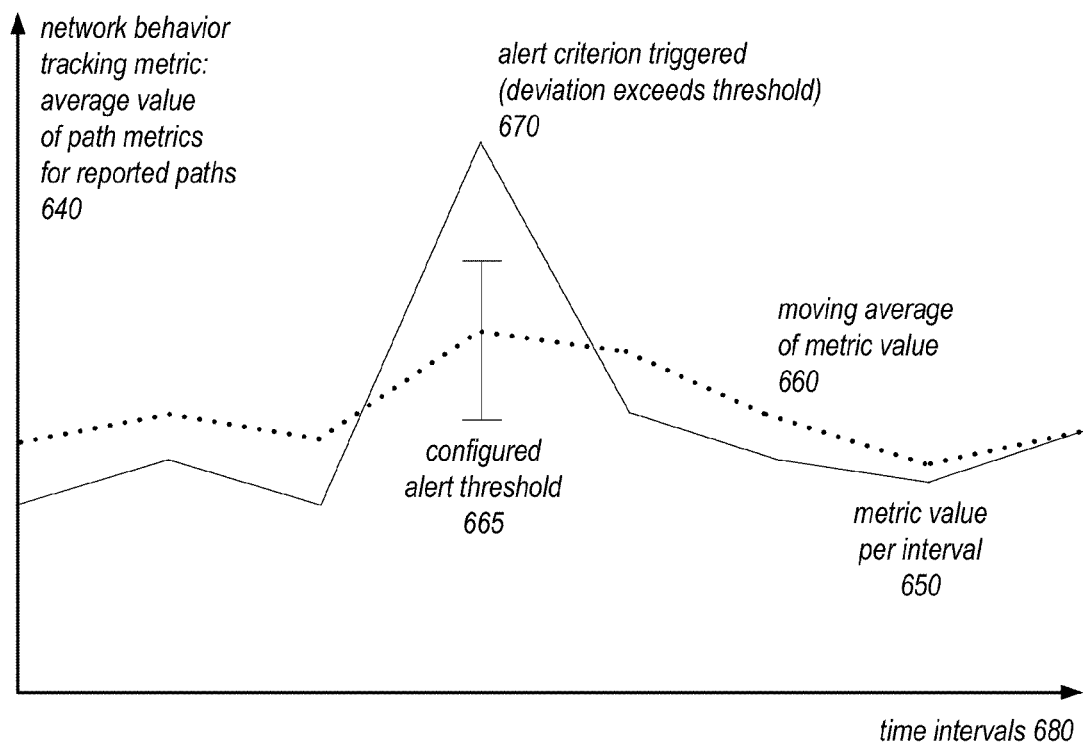

FIGS. 6A and 6B illustrate example network behavior tracking metrics that are used by the cyberattack detection system to generate alerts about a computer network.

In some embodiments, in addition to generating alerts that report suspicious connection graphs or connection paths, the cyberattack detection system may also generate alerts based on changes in a set of network behavior tracking metrics (e.g. metrics 610 and 640) for the network as a whole. In some embodiments, the network behavior tracking metrics may be computed using the connection graphs or connection paths generated during the lateral movement detection process. Significant changes in these tracking metrics in a time interval will cause alerts to be generated. In some embodiments, the configuration interface of the system may be used to define a number of such network behavior tracking metrics to be monitored.

As shown in FIG. 6A, a network behavior tracking metric 610 is tracked over successive time intervals 630. In this example, the metric 610 tracks the minimum value of graph metrics for reported graphs. As discussed, in some embodiments, suspicious connection graphs may be identified and reported based on a ranking scheme, so that the threshold graph metric value of a suspicious graph can change from interval to interval. During an interval when the network is experiencing highly anomalous behavior, the minimum value of a reported graph may spike due to wide-spread anomalous behavior in a large number of connection graphs. As shown, this condition is detected at point 620 in the graph, where an alert criterion is triggered. The alert criterion may be set based on a threshold, so that it is triggered whenever the deviation 625 of the metric value from a last time interval exceeds the threshold. The alert may be displayed or broadcast via the output interface of the system, so that network administrators can take a closer examination at the network data for suspicious behavior based on the alert.

FIG. 6B shows another type of network behavior tracking metric 640, which tracks the average value of the path metric of all reported paths in a time interval. As will be appreciated by those skilled in the art, other types of network behavior tracking metrics may also be tracked, other than the example metrics shown here. In some embodiments, the system may be configured to track a combination of multiple network behavior tracking metrics. In this example, the metric value 650 is tracked on a per-interval basis. A moving average of the metric 660 is also maintained. The parameters of the moving average (e.g. the averaging window) may be adjusted via the configuration interface. An alert threshold 665 is defined for the metric, which specifies a range of values around the moving average value that is considered normal fluctuation of the metric (and thus does not trigger an alert). The alert threshold may be specified as a fixed value, or as value that changes from interval to interval (e.g. based on a standard deviation of previous metric values). As shown in this example, at point 670, the value of metric 640 exceeds the alert threshold range with respect to the moving average, and an alert will be triggered as a result.

Figure 7A:
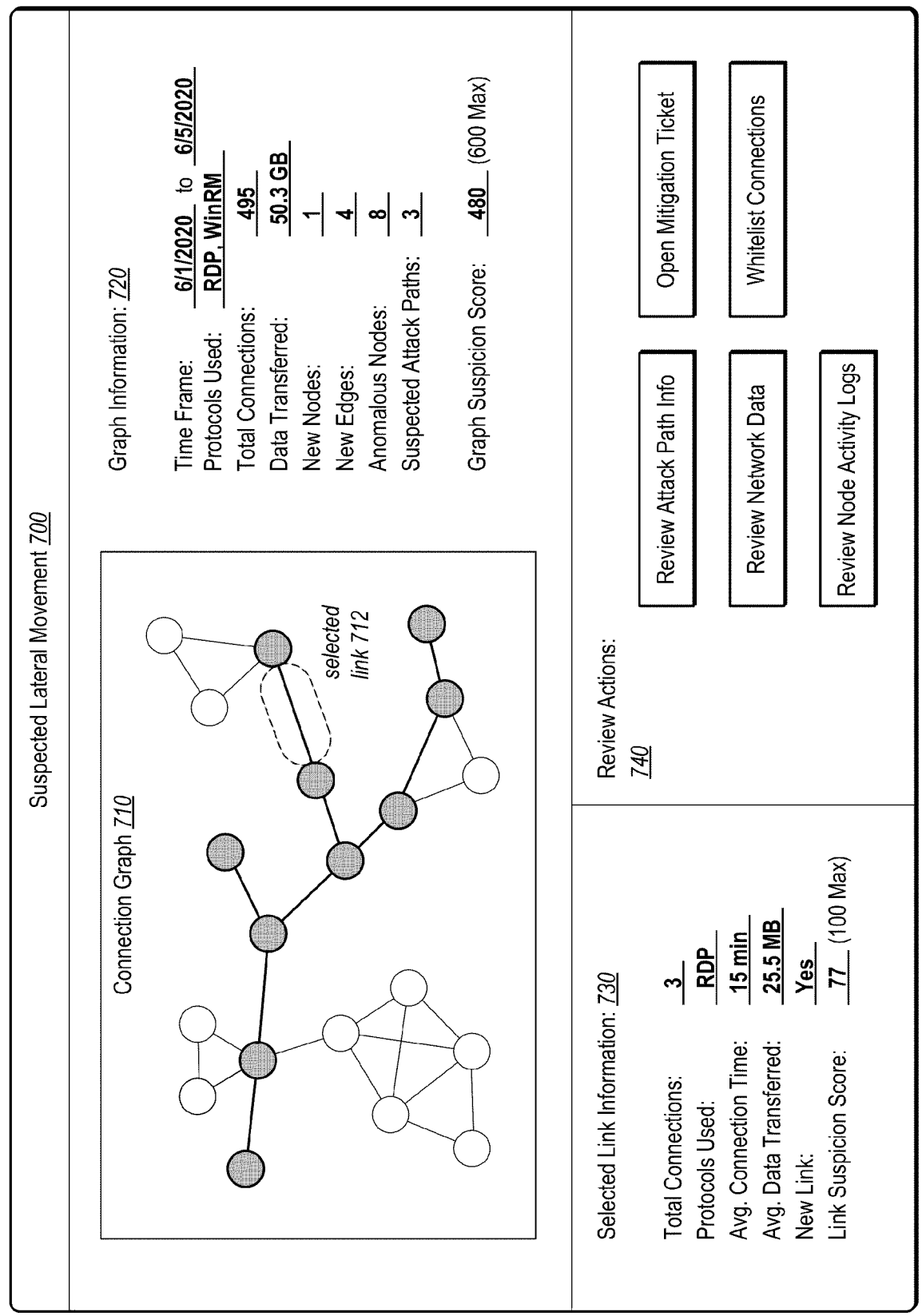
FIG. 7A illustrates an example graphical user interface of the cyberattack detection system that provides information about a suspected lateral movement in a computer network, according to some embodiments.

FIG. 7A illustrates an example graphical user interface of the cyberattack detection system that provides information about a suspected lateral movement in a computer network, according to some embodiments. The GUI 700 shown in the figure is one example of the output interface 190 of FIG. 1.

As shown, GUI 700 displays a suspected lateral movement that is detected by the cyberattack detection system. In this example, the connection graph 710 associated with the detected lateral movement is displayed graphically. The graph 710 highlights certain nodes and edges to indicate the nodes and paths that are involved in suspected lateral movement attack paths.

As shown, the GUI includes a graph information section 720 that provides a number of informational items about the graph 710, such as the communication protocols used, the time frame of the connection behaviors shown, the total number of connections represented by the graph, the amount of data transferred within the graph, etc. In this example, the provided information also includes some anomaly indicators detected by the system, such as the number of new nodes using a new protocol included in the graph, the number of new edges that include first time connections between two nodes in the graph, and the total number of anomalous nodes in the graph. Additionally, in this example, the provided information also includes the graph suspicion score associated with the graph, which represents the determined graph metric of the graph.

In this example, the GUI allows users to select elements within the displayed connection graph 710 (e.g. individual nodes, path links, or entire connection paths) in order to view detailed information about the elements. In this example, a particular path link 712 is selected, and information about that link is provided in section 730.

As shown in this example, the GUI 700 also includes a review actions section 740, which provides a number of control elements to allow the user to perform a variety of actions when reviewing the reported lateral movement. In this example, the user may click on the buttons to review additional information about the lateral movement, such as information about a particular attack path (e.g. the various factors that were used to compute the path metric), the underlying network data that was used to generate the connection graph 710, and also node activity logs associated with the period represented by connection graph. These control elements will allow a user to thoroughly examine various data associated with the reported connection graph in order to determine if a lateral movement has truly occurred. If the suspected lateral movement is verified, the user may choose to initiate certain mitigation actions against the attack by opening a mitigation ticket. On the other hand, if a review of the data indicates that there is no lateral movement, the user may choose to whitelist certain connections or connection behaviors indicated in the data, so that they are incorporated into the baseline of legitimate behaviors of the network. In some embodiments, a small set of suspected lateral movements may be reported in this manner for each time interval (e.g. once a week), so that network administrators can focus their attention on the most suspicious areas of the network that is exhibiting questionable connection behaviors.

FIG. 7B illustrates an example configuration interface of the cyberattack detection system that allows users to configure operational aspects of the system, according to some embodiments. The configuration GUI 750 shown in the figure is an example of the configuration interface 272 of FIG. 2.

As shown, the configuration GUI 750 allows a user to configure various parameters to control aspects of the lateral movement detection process discussed in connection with FIG. 1. In this example, the GUI 750 includes a general settings section 760. This section allows the user to specify whether suspected lateral movement detection is to be performed periodically according to a schedule, and if so, how often detection should be performed. In some embodiments, the configuration interface may allow users to specify trigger conditions that will trigger a lateral movement detection process (e.g., if the activity level of the network or a particular node exceeds a specified threshold).

As shown, the general settings section also provides an option that allows the system to automatically update the network behavior baseline (e.g. the baseline 134 of FIG. 1), as well as auto-update rules for the baseline. For example, in some embodiments, a particular type of connection may be automatically added to the baseline if it consistently occurs for some number of consecutive time periods.

As shown, the general settings also include a setting that limits the lateral movement detection to a specified set of communication protocols. As discussed, the protocols of the connections may be determined from the network data based on the destination port numbers used by the connections, or inferred from the actual network traffic relating to the connections.

As shown, the general settings also include different types of filters to exclude certain types of data from the lateral movement detection process. In this example, the configuration GUI allows the user to explicitly specify an IP or CIDR address range or list to indicate nodes that are to be excluded from the detection process. Additionally, the GUI also allows users to specify rules for determining when a node is to be excluded as a suspected scanner node (here, when a node has made 6 or more outgoing connection during the time interval).

As shown, the configuration GUI 750 also provides a section 770, which allows the user to configure settings relating to the evaluation of connection graphs. In this example, the detection process will report five of the highest-ranking graphs as graphs with suspected lateral movement. The section also provides the user a way to configure how the graph ranking metric (e.g. graph metric 152) is calculated. For example, the user may be permitted to specify the types of graph properties or anomaly indicators that are used to calculate the graph ranking metric, and how these values are combined to obtain the final value for the graph ranking metric.

As shown, the configuration GUI 750 also includes a section 780, which allows the user to configure settings related to the evaluation of connection paths as suspected attack paths. In this example, the configurations specify that any suspected attack path must have a path length of at least three path links, and each connection in the time-ordered path must be made within 24 hours. The configurations also specify that that the system will report the two highest-ranking paths for each graph as suspected attack paths. Additionally, the section provides a way for the user to configure how the path ranking metric (e.g. path metric 182) is calculated, similar to the configuration of the graph ranking metric in section 770. As will be appreciated by those skilled in the art, the parameters shown in this figure are merely examples. In various other embodiments, other types of configuration parameters may also be provided to configure the operations of the lateral movement detection process.

Figure 8:
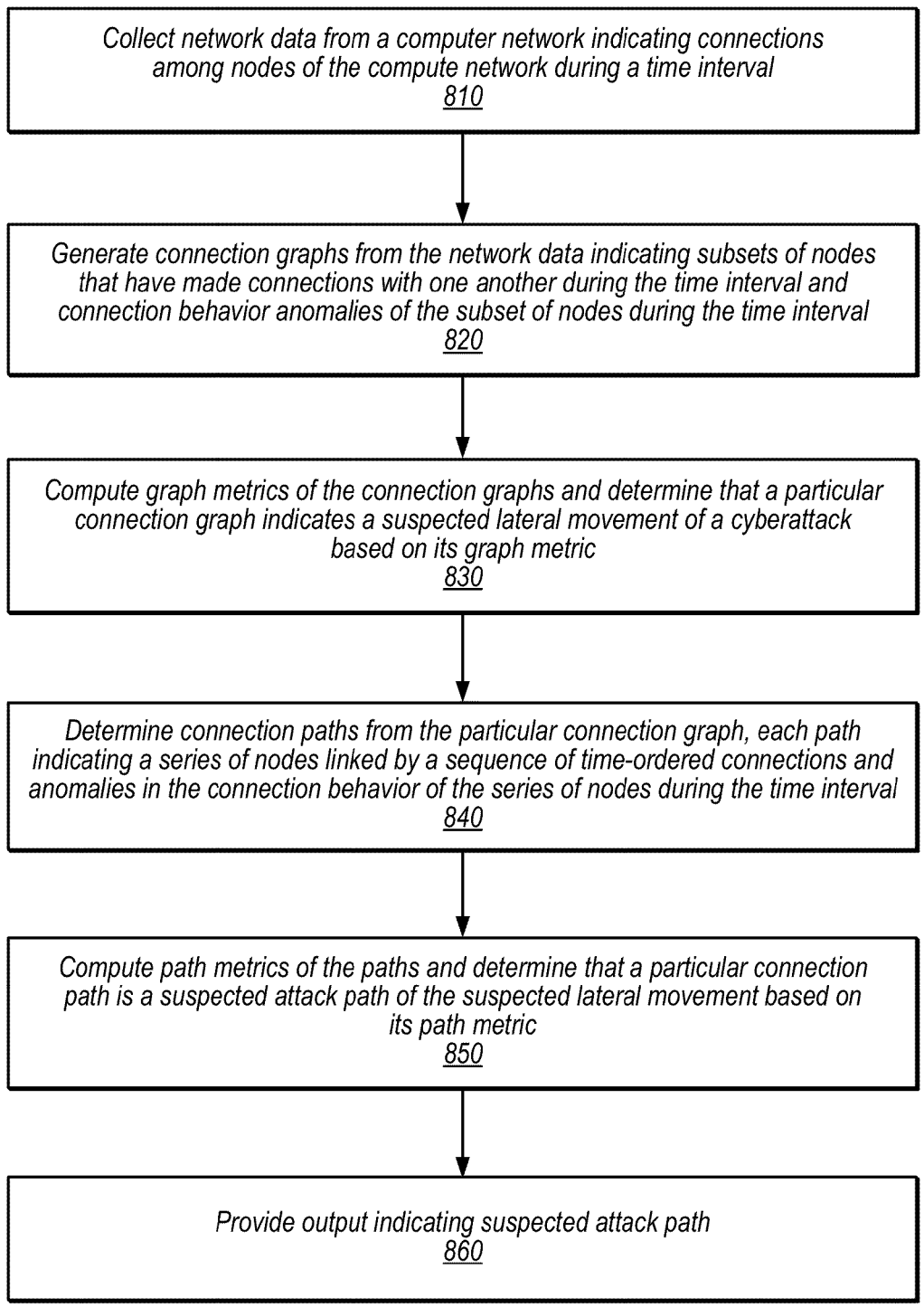
FIG. 8 is a flowchart illustrating a process performed by a cyberattack detection system to detect a lateral movement in a computer network, according to some embodiments.

FIG. 8 is a flowchart illustrating a process performed by a cyberattack detection system to detect a lateral movement in a computer network, according to some embodiments. The depicted process may be performed by an embodiment of the cyberattack detection system 100 of FIG. 1.

The process begins at operation 810, where network data is collected from a computer network. The network data indicates connections among nodes of the computer network during a time interval. In some embodiments, the network data may include metadata about data traffic between nodes of the network, and but not node-specific metadata collected by specialized data collection agents on the nodes themselves. The network data (e.g. network data 122 of FIG. 1) may be collected periodically by a network data collector component (e.g. collector 120 of FIG. 1). In some embodiments, the collection may be performed by network data collection points in the network such as collection points 216 of FIG. 2.

At operation 820, a set of connection graphs are generated from the network data for the time interval. The connection graphs (e.g. connection graphs 140 of FIG. 1) may each indicate subsets of nodes in the network that have made connections to one another during the time interval. The connection graphs may also indicate one or more connection behavior anomalies (e.g. anomalies 136 of FIG. 1) in the subset of nodes during the time interval. Examples of anomalies may include new nodes that made connections using a new communication protocol during the time interval, nodes that have made connections to new destination nodes during the time interval, nodes that have made an unusually large number of connections during the interval, nodes that have made uploaded or downloaded an unusually large amount of data over its connections during the time interval, among other types of anomalies. In some embodiments, these anomalies may be detected by comparing newly collected network data to a baseline of previously observed connection behaviors of the network (e.g. baseline 134 of FIG. 1). In some embodiments, the baseline may evolve over time to more types of connection behaviors that are accepted as legitimate behavior in the network.

At operation 830, graph metrics (e.g. graph metrics 152 of FIG. 1) are computed for respective ones of the connection graphs. The graph metrics are then used determine one or more particular connection graphs that indicate a suspected lateral movement of a cyberattack. In some embodiments, the graph metric may be computed based on various graph properties of the graph (e.g. graph properties 420 of FIG. 4), which may include the connection behavior anomalies determined in operation 820. In some embodiments, the graphs may be ranked according to their respective graph metrics, and a specified number of highest-ranked graphs are determined to be those with suspected lateral movement attacks. These suspicious graphs may be reported to the network administrators and/or retained for further analysis by the cyberattack detection system.

At operation 840, a set of connection paths (e.g. connection paths 170 of FIG. 1) are determined from the particular one or more graphs, where each path indicates a series of nodes linked by a sequence of time-ordered connections. Anomalies in the connection behaviors of the series of nodes may also be included as node or link attributes in time-ordered connection path. In some embodiments, the connection paths generated from a connection graph may be limited to include only those paths of a certain path length, or only paths whose successive connections were made within a maximum time limit. In some embodiments, all qualifying connection paths will be generated for the graph, and evaluated as potential lateral movement attack paths.

At operation 850, path metrics (e.g. path metrics 182 of FIG. 1) are computed for respective ones of the paths. The path metrics are used determine one or more particular connection paths that indicate a suspected attack paths of the lateral movement. In some embodiments, the path metric may be computed based on various path properties of the path (e.g. path properties 520 of FIG. 5), which may include the connection behavior anomalies determined in operation 820. In some embodiments, the paths may be ranked according to their respective path metrics, and a specified number of highest-ranked paths are determined to be the suspected attack path of the interval.

At operation 860, the suspected attack path(s) are output. In some embodiments, the output may be provided via an output interface (e.g. output interface 190 of FIG. 1), which may be a graphical user interface or a notification interfaces that broadcasts alert notifications to registered user accounts of network administrators. In some embodiments, the output may indicate any connection behavior anomalies, suspicious connection graphs, and suspected attack paths discovered by the lateral movement detection process. In some embodiments, the output interface may provide data such as those provided by GUI 700 of FIG. 7A. Such data may be reviewed by network administrators to determine if the reported behavior is truly an instance of lateral movement in a cyberattack.

Figure 9:
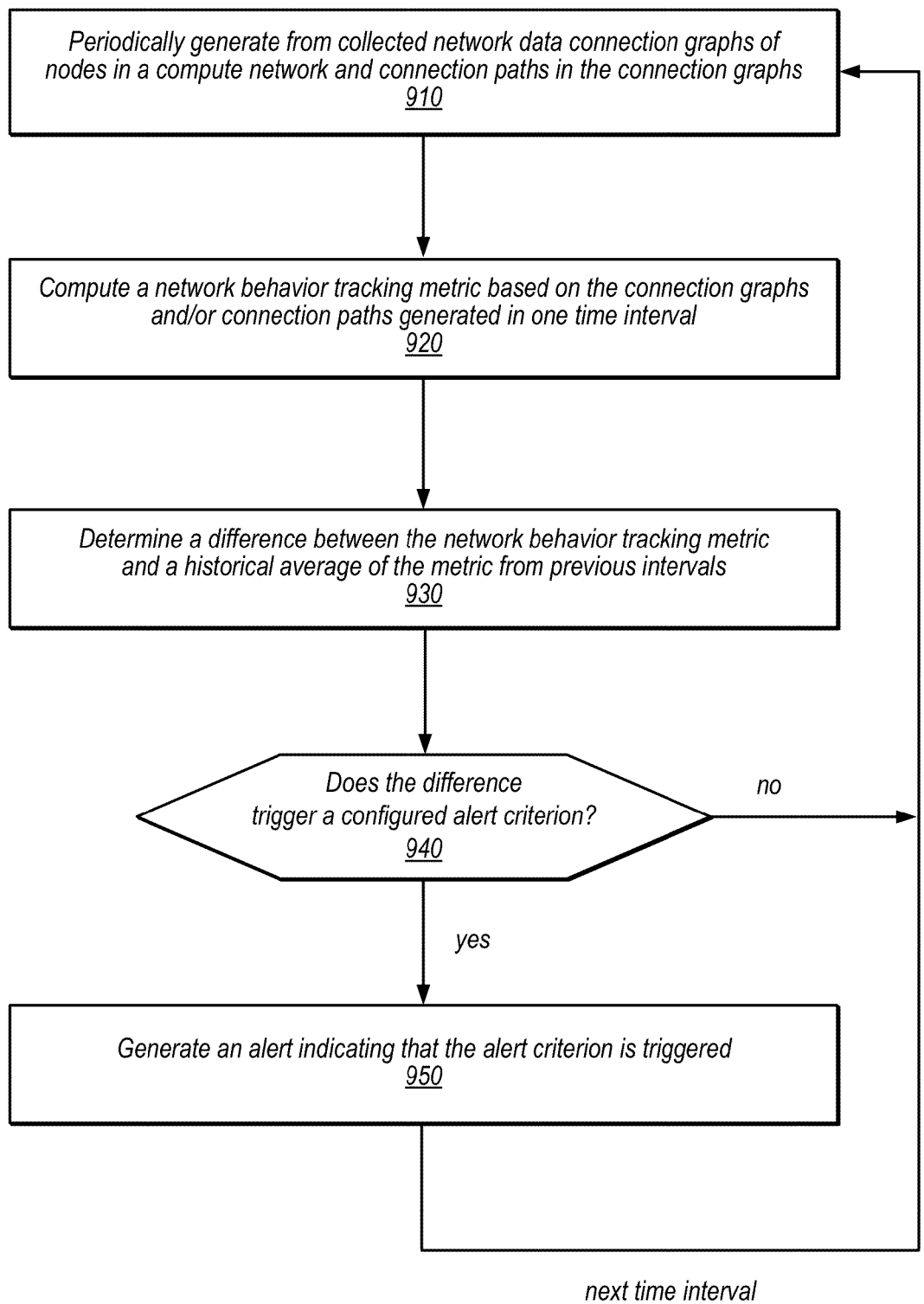
FIG. 9 is a flowchart illustrating a process of using a network behavior tracking metric to track changes in the behavior of a computer network and generate alerts based on the changes, according to some embodiments.

FIG. 9 is a flowchart illustrating a process of using a network behavior tracking metric to track changes in the behavior of a computer network and generate alerts based on the changes, according to some embodiments. In some embodiments, the depicted process here may include network behavior tracking functionality as discussed in connection with FIGS. 6A and 6B.

As shown, the depicted process implements a loop, where each iteration of the loop is performed for a successive time interval. At operation 910, connection graphs and connection paths are generated from collected network data. The connection graphs and connection paths may be generated in similar manner as discussed in connection with FIG. 8. These connection graphs and connection paths may be generated continuously and periodically as part of the lateral movement detection process.

At operation 920, a network behavior tracking metric (e.g. metrics 610 or 640 of FIGS. 6A and 6B) is computed for the time interval, based on the connection graphs and/or connection paths generated in that time interval. The network behavior tracking metric may indicate some quantitative measure of the amount of anomalous connection behavior of the computer network as a whole. In some embodiments, the metric may be an average, minimum, or maximum of the path metrics generated for that time interval. In some embodiments, the metric may be an average, minimum, or maximum of the graph metrics generated for that time interval.

In some embodiments, the metric may be an aggregate metric that is calculated based on a combination of multiple individual network behavior tracking metrics. In some embodiments, the system may be configured to generate and track multiple network behavior tracking metrics individually.

At operation 930, a difference is determined between the network behavior tracking metric of the time interval and a historical average of the metric from previous intervals. The difference is used to determine if the network is exhibiting out-of-the-ordinary behavior during the time interval. In some embodiments, the difference may simply be the change in the metric from the last time interval. In some embodiments, the historical average may be computed based on a window of some number of most recent intervals. In some embodiments, the historical average may be a moving average that is repeatedly recomputed for each new time interval.

At operation 940, a determination is made whether the difference triggers a configured alert criterion. The alert criterion may be configurable via a configuration interface such as configuration interface 272 of FIG. 2. In some embodiments, the alert criterion may indicate a deviation threshold. If the difference computed in operation 930 exceeds the configured threshold, an alert will be triggered. In some embodiments, the alert criterion may indicate a bounded range of acceptable values around the historical average, so that an alert will be triggered if the value of the metric for the current time interval falls outside the range. In some embodiments, the range may be dynamically recalculated for each time interval. In some embodiments, the bound range may be based on the standard deviation of metric values in a specific number of previous intervals (e.g., 2.5 standard deviations based on the 10 previous metric values). If the difference triggers the alert criterion the process proceeds to operation 950. If not, the process loops back to operation 910 to continue tracking the network behavior tracking metric for the next time interval.

At operation, an alert is triggered. In some embodiments, the alert may indicate the particular alert criterion that was triggered. In some embodiments, the alert may indicate information to the network administrator (e.g. the value of the network behavior tracking metric) to allow the network administrator to understand the conditions that cause the alert. In some embodiments, the alert may be generated via a notification interface (e.g. output interface 190) that will push alerts to registered user accounts. For example, in some embodiments, the alert may be pushed to the user as a text, an email, or some other type of pushed data. In some embodiments, the alert may also be logged in an event log maintained for the monitored network.

Figure 10:
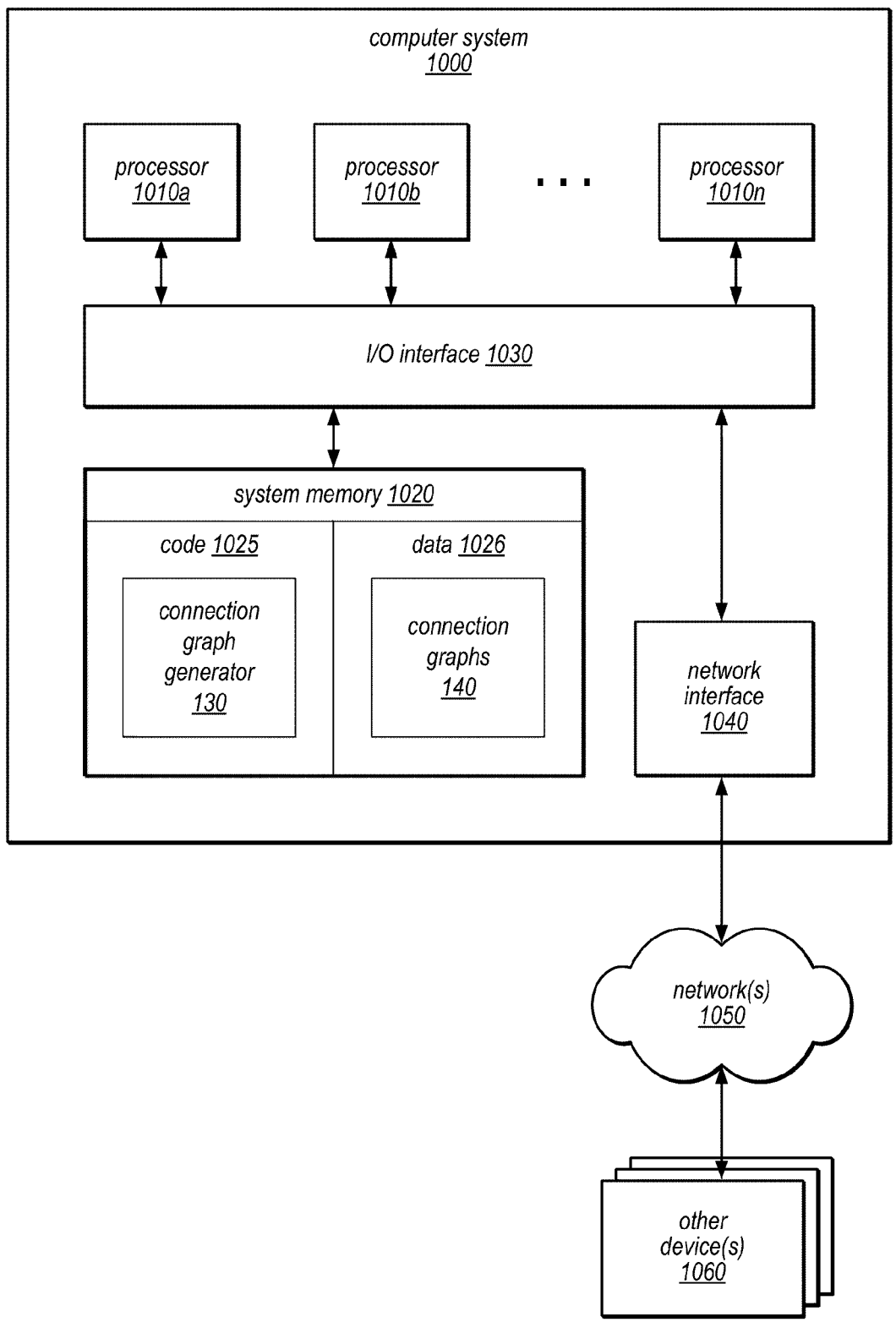
FIG. 10 is a block diagram illustrating an example computer system that can be used to implement one or more portions of a cyberattack detection system that uses connection graphs to detect suspected lateral movements in a computer network, according to some embodiments.

FIG. 10 is a block diagram illustrating an example computer system that can be used to implement one or more portions of a cyberattack detection system that uses connection graphs to detect suspected lateral movements in a computer network, according to some embodiments. For example, the computer system 1000 may be a server that implements one or more components of the cyberattack detection system 100 of FIG. 1 or the network monitoring service 230 of FIG. 2.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1000 includes one or more processors 1010, which may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010a-n, as shown. The processors 1010 may be any suitable processors capable of executing instructions. For example, in various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another server application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may include instructions to implement the connection graph generator 130, as discussed. The system memory 1020 may also be used to store data 1026 needed or produced by the executable instructions. For example, the in-memory data 1026 may include portions of the connection graphs 140, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A system, comprising: one or more hardware processors with associated memory that implement a cyberattack detection system, configured to:
   collect network data from a computer network, wherein the network data indicates connections made or attempted among nodes of the computer network during a time interval and respective times that the connections were made or attempted;
   generate a plurality of connection graphs from the network data, wherein each of the connection graphs indicates a subset of the nodes of the computer network that made or attempted connections with one another during the time interval and one or more anomalies in connection behavior of the subset of nodes during the time interval;
   compute a graph metric for each of the connection graphs based on a highest degree of nodes in individual ones of the connection graphs and determine, based on the graph metric, a set of highest-ranking connection graphs to evaluate for a suspected lateral movement of a cyberattack during the time interval;
   for each connection graph in the set of highest-ranking connection graphs:
      determine a connection path from the connection graph, wherein the connection path indicates a series of nodes linked by a sequence of time-ordered connections and one or more anomalies in connection behavior of the series of nodes during the time interval; and
      compute a path metric of the connection path and determine, based on the path metric, that the connection path is a suspected attack path of the suspected lateral movement; and
   provide an output that indicates the suspected attack paths during the time interval.

2. The system of claim 1, wherein the cyberattack detection system is configured to:
   determine the set of highest-ranking connection graphs based on a specified number of connection graphs for the set.

3. The system of claim 1, wherein the cyberattack detection system is configured to:
   generate a plurality of connection paths of time-ordered connections from the connection graph, including the connection path;
   compute respective path metrics of the connection paths;
   rank the connection paths according to their respective path metrics; and
   wherein the determination that the connection path is a suspected attack path is made based on a rank of the connection path among the plurality of connection paths.

4. The system of claim 1, wherein the cyberattack detection system is configured to:
   determine, from the network data, the one or more connection behavior anomalies indicated in the connection graph, including one or more of:
      a node making a connection using a new protocol during the time interval,
      a node making a connection to a new destination node during the time interval, and
      a node making more connection during the time interval compared to one or more previous time intervals; and
   wherein the graph metric is computed based on the one or more connection behavior anomalies.

5. The system of claim 1, wherein the cyberattack detection system is configured to:
   determine that a particular node in the computer network is a scanner node configured to attempt connections to a plurality of other nodes; and
   exclude the scanner node from the generation of the connection graph.

6. The system of claim 1, wherein the cyberattack detection system is configured to:
   determine that a particular connection in the network data is a whitelisted connection; and
   exclude the whitelisted connection from the generation of the connection graph.

7. The system of claim 1, wherein the cyberattack detection system is implemented with resources of a platform-as-a-service (PaaS) provider, and comprises:
   a network data collection service configured to collect network data from a plurality of client networks; and an attack monitoring service configured to programmatically generate alerts indicating suspected lateral movement in the client networks.

8. A method, comprising: performing, by one or more computers that implement a cyberattack detection system:
collecting network data from a computer network indicating connections made or attempted among nodes of the computer network during a time interval and respective times that the connections were made or attempted;
generating a plurality of connection graphs from the network data, wherein each of the connection graphs indicates a subset of the nodes of the computer network that made or attempted connections with one another during the time interval and one or more anomalies in connection behavior of the subset of nodes during the time interval;
computing a graph metric for each of the connection graphs based on a highest degree of nodes in individual ones of the connection graphs and determining, based on the graph metric, a set of highest-ranking connection graphs to evaluate for a suspected lateral movement of a cyberattack during the time interval;
determine, based on the graph metric, a set of highest-ranking connection graphs to evaluate for a suspected lateral movement of a cyberattack during the time interval;
for each connection graph in the set of highest-ranking connection graphs:
determining a connection path from the connection graph, wherein the connection path indicates a series of nodes linked by a sequence of time-ordered connections and one or more anomalies in connection behavior of the series of nodes during the time interval; and
computing a path metric of the connection path and determining, based on the path metric, that the connection path is a suspected attack path of the suspected lateral movement; and
generating an output indicating the suspected attack paths during the time interval.

9. The method of claim 8, wherein:
the network data includes connections of different communication protocols, including two or more of:
Secure Shell (SSH) protocol,
Windows Remote Management (WinRM) protocol,
Remote Desktop Protocol (RDP), and
Server Message Block (SMB) protocol; and
the connection graph indicates the different communication protocols.

10. The method of claim 8, wherein:
the graph metric is computed based on two or more of:
an order of the connection graph,
a size of the connection graph,
a diameter of the connection graph,
a number of distinct communication protocols included in the connection graph,
a presence or count of new nodes in the connection graph, and a presence or count of new edges in the connection graph.

11. The method of claim 8, wherein:
the path metric is computed based on two or more of:
a number of links in the connection path,
a number of distinct communication protocols included in the connection path,
a presence or count of new nodes in the connection path, and
a presence or count of new links in the connection path.

12. The method of claim 8, further comprising performing, by the cyberattack detection system:
repeatedly generating a plurality of connection graphs from the network data periodically based on a specified schedule.

13. The method of claim 8, the generating of the connection graph is triggered by a detection that one or more nodes in the network data exceeded an activity level threshold during the time interval.

14. The method of claim 8, further comprising performing, by the cyberattack detection system:
computing, at successive time intervals, a network behavior tracking metric based on a plurality path metrics of suspected attack paths determined during each time interval;
determining that a difference between the network behavior tracking metric in one time interval and a historical average of the network behavior tracking metric triggers an alert criterion; and
generating an alert responsive to the triggering of the alert criterion.

15. The method of claim 8, wherein:
the output is provided via a graphical user interface of the cyberattack detection system; and
the output includes the connection graph and the connection path.

16. The method of claim 8, wherein:
the output is provided via a notification interface of the cyberattack detection system that sends one or more notifications of the suspected lateral movement to one or more registered user accounts.

17. The method of claim 8, further comprising performing, by the cyberattack detection system:
receiving, via a configuration interface, configuration information specifying one or more graph properties to use to compute the graph metric; and
receiving, via the configuration interface, additional configuration information specifying one or more path properties to use to compute the path metric.

18. One or more non-transitory computer-accessible storage media storing program instructions that when executed on or across one or more processors implement at least a portion of a cyberattack detection system and cause the cyberattack detection system to:
analyze network data collected from a computer network, wherein the network data indicates connections made or attempted among nodes of the computer network during a time interval and respective times that the connections were made or attempted;
generate a plurality of connection graphs from the network data, wherein each of the connection graphs indicates a subset of the nodes of the computer network that made or attempted connections with one another during the time interval and one or more anomalies in connection behavior of the subset of nodes during the time interval;
compute a graph metric for each of the connection graphs based on a highest degree of nodes in individual ones of the connection graphs and determine, based on the graph metric, a set of highest-ranking connection graphs to evaluate for a suspected lateral movement of a cyberattack during the time interval;
for each connection graph in the set of highest-ranking connection graphs:
determine a connection path from the connection graph, wherein the connection path indicates a series of nodes linked by a sequence of time-ordered connections and one or more anomalies in connection behavior of the series of nodes during the time interval; and compute a path metric of the connection path and determine, based on the path metric, that the connection path is a suspected attack path of the suspected lateral movement; and generate output that indicates the suspected attack paths during the time interval.

19. The one or more non-transitory computer- accessible storage media of claim 18, wherein the program instructions when executed on or across the one or more processors cause the cyberattack detection system to: determine the set of highest-ranking connection graphs based on a specified number of connection graphs for the set.

20. The one or more non-transitory computer-accessible storage media of claim 18, wherein the program instructions when executed on or across the one or more processors cause the cyberattack detection system to:

compute, at successive time intervals, a network behavior tracking metric based on a plurality path metrics of suspected attack paths determined during each time interval;

determine that a difference between the network behavior tracking metric in one time interval and a historical average of the network behavior tracking metric triggers an alert criterion; and generate an alert responsive to the triggering of the alert criterion.

\* \* \* \* \*